Nov. 30, 1965    J. MARTIN    3,220,049
APPARATUS FOR THE TREATMENT OF EDIBLE CRUSTACEA
Filed April 19, 1960    6 Sheets-Sheet 1
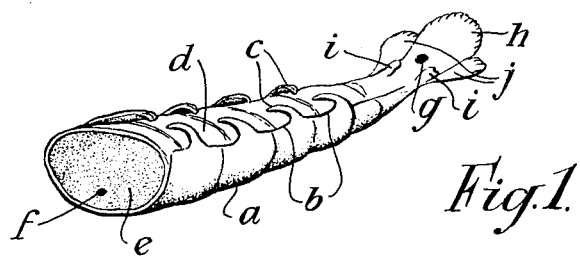
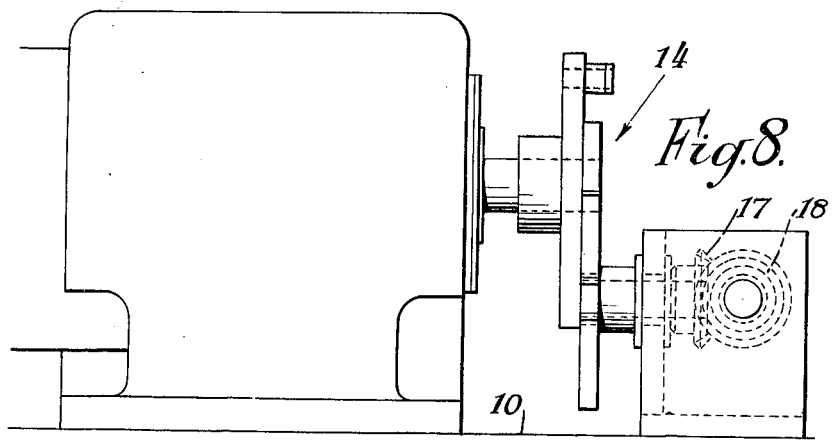
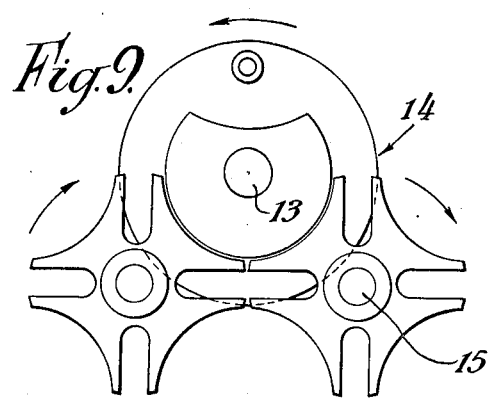
INVENTOR
JOHN MARTIN
BY John Howard Pearson
ATTORNEY

Nov. 30, 1965       J. MARTIN       3,220,049
APPARATUS FOR THE TREATMENT OF EDIBLE CRUSTACEA
Filed April 19, 1960                         6 Sheets-Sheet 2
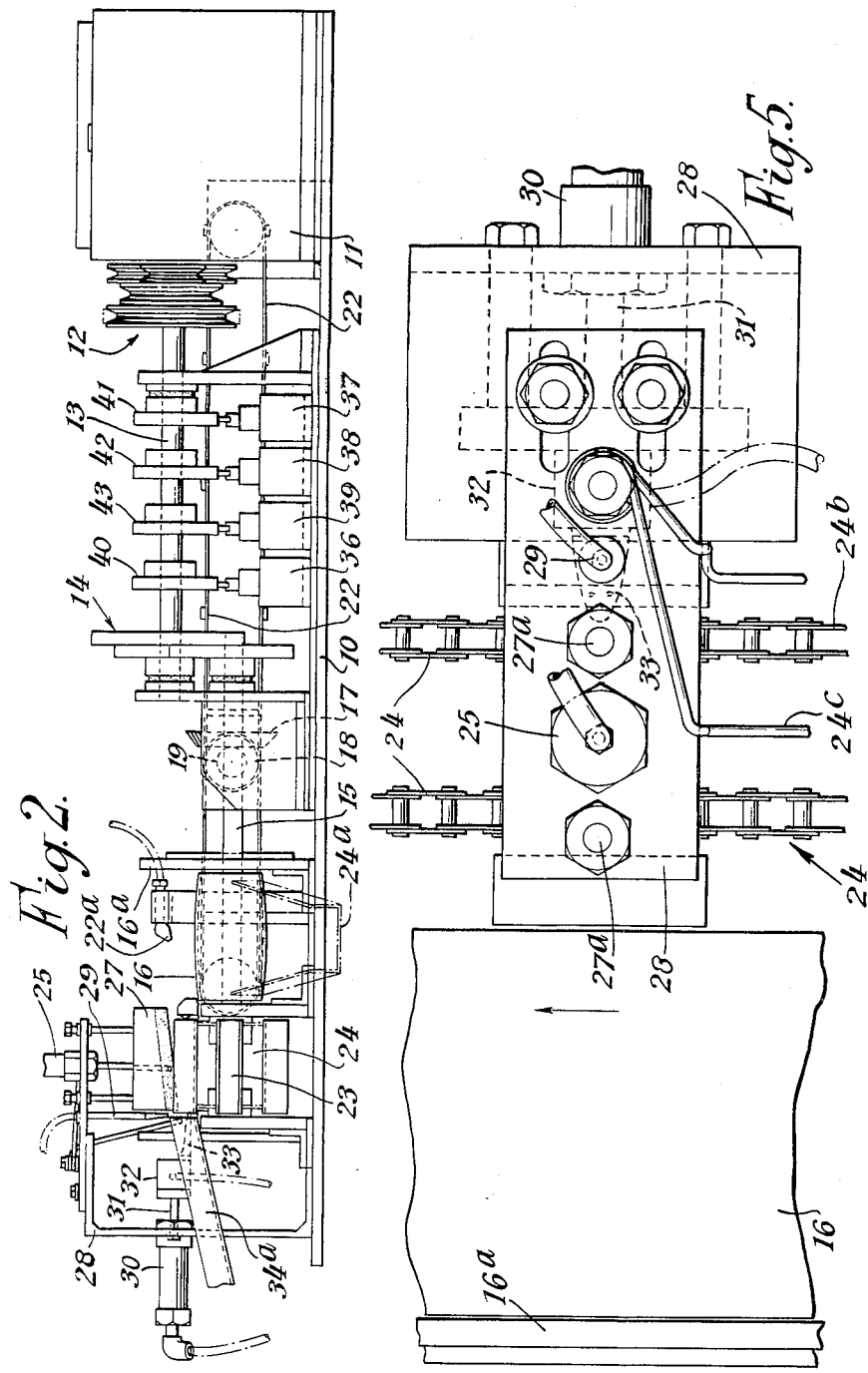
INVENTOR
JOHN MARTIN
BY John Howard Pearson
ATTORNEY

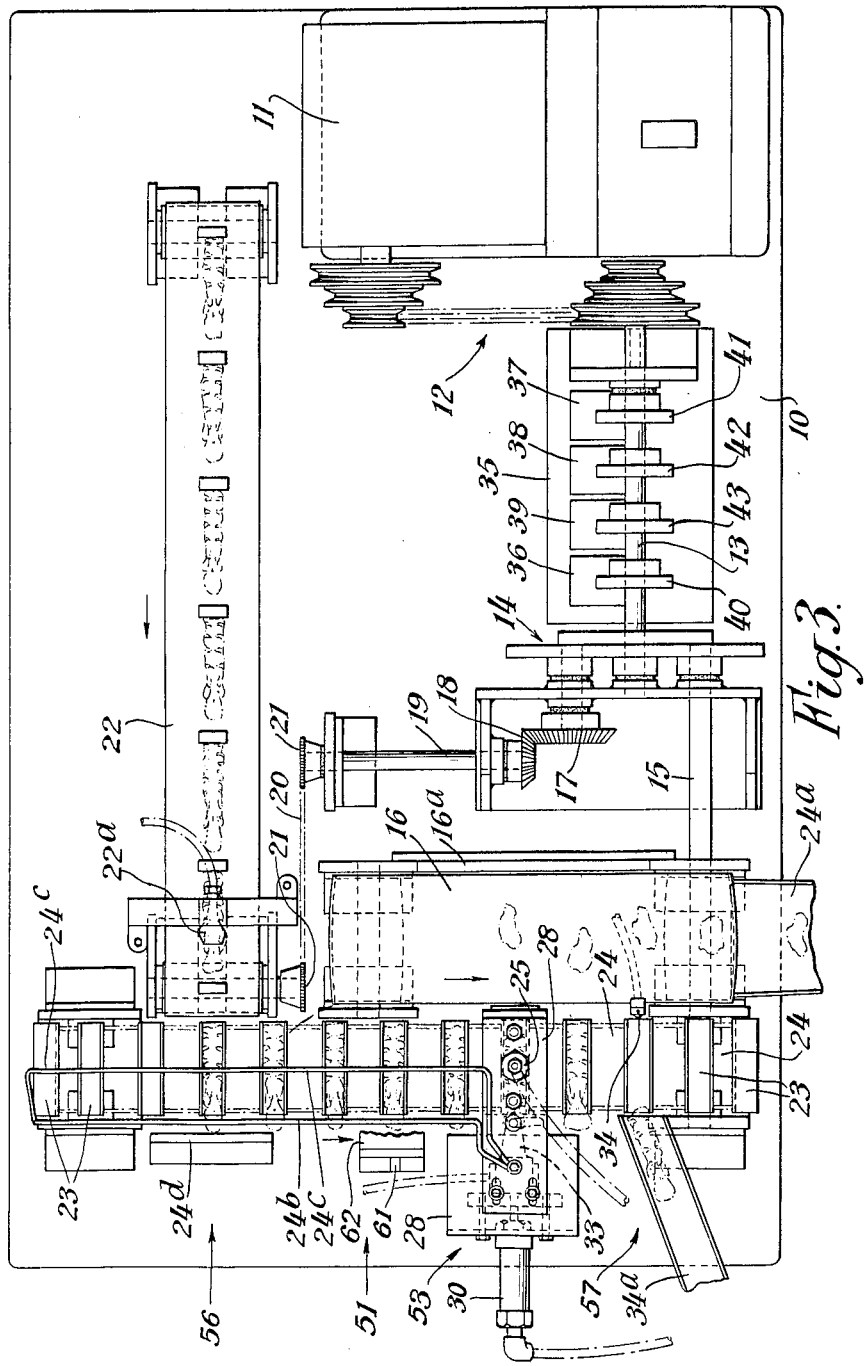

Nov. 30, 1965  J. MARTIN  3,220,049
APPARATUS FOR THE TREATMENT OF EDIBLE CRUSTACEA
Filed April 19, 1960  6 Sheets-Sheet 4
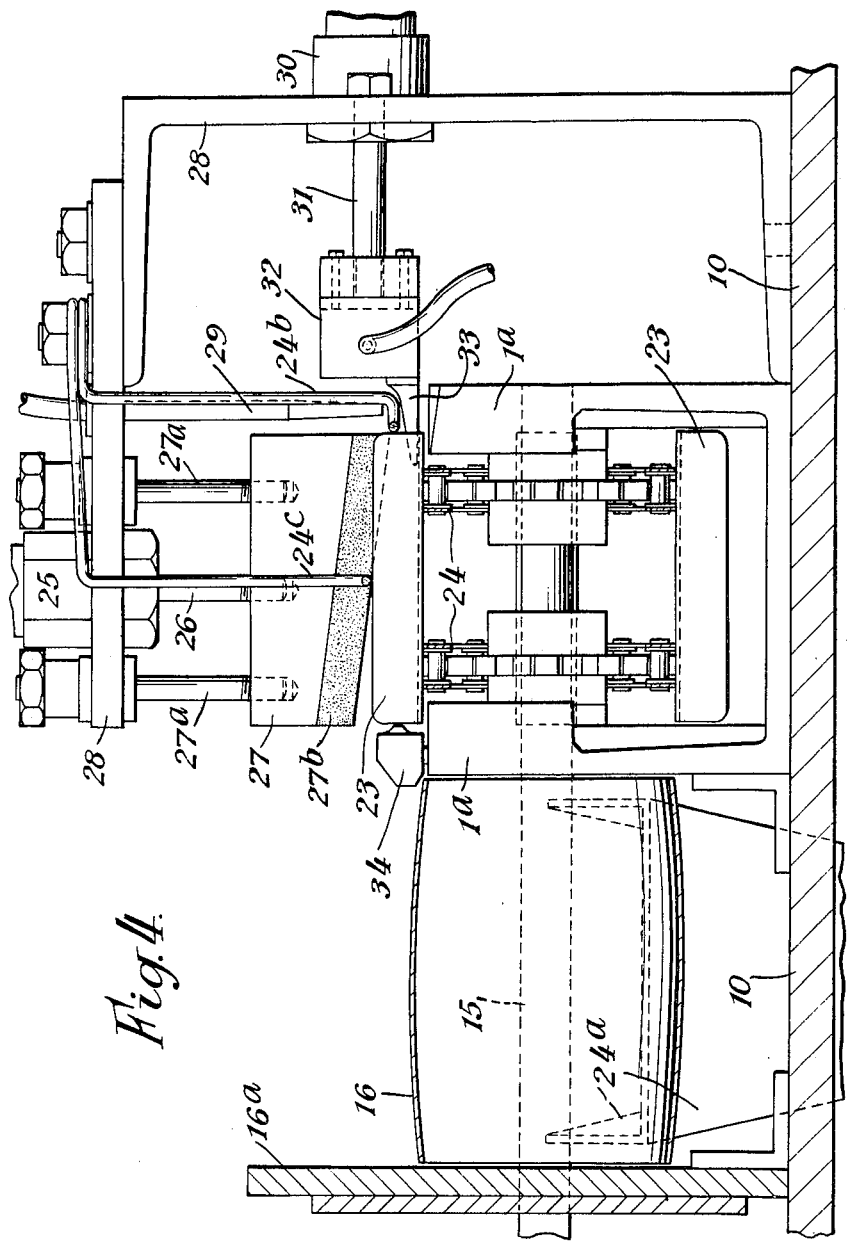
INVENTOR
JOHN MARTIN
BY
John Howard Pearson
ATTORNEY

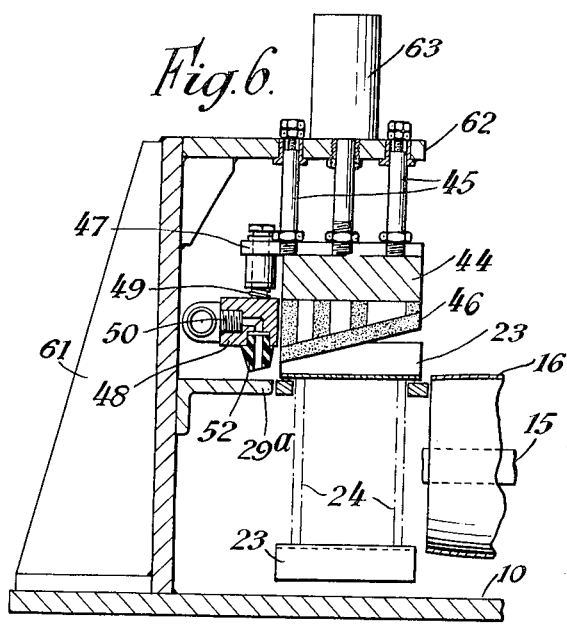
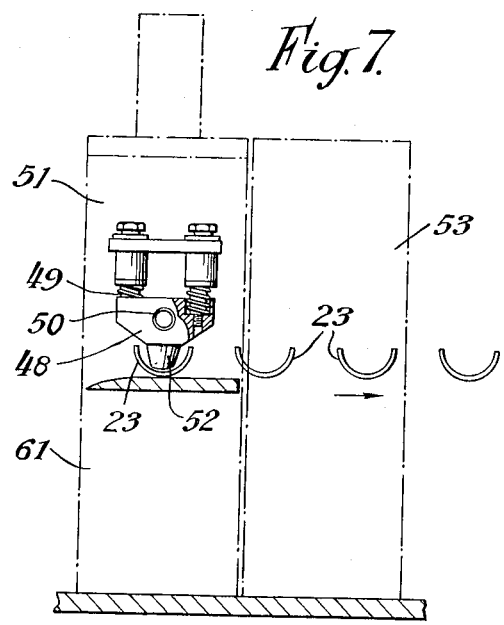

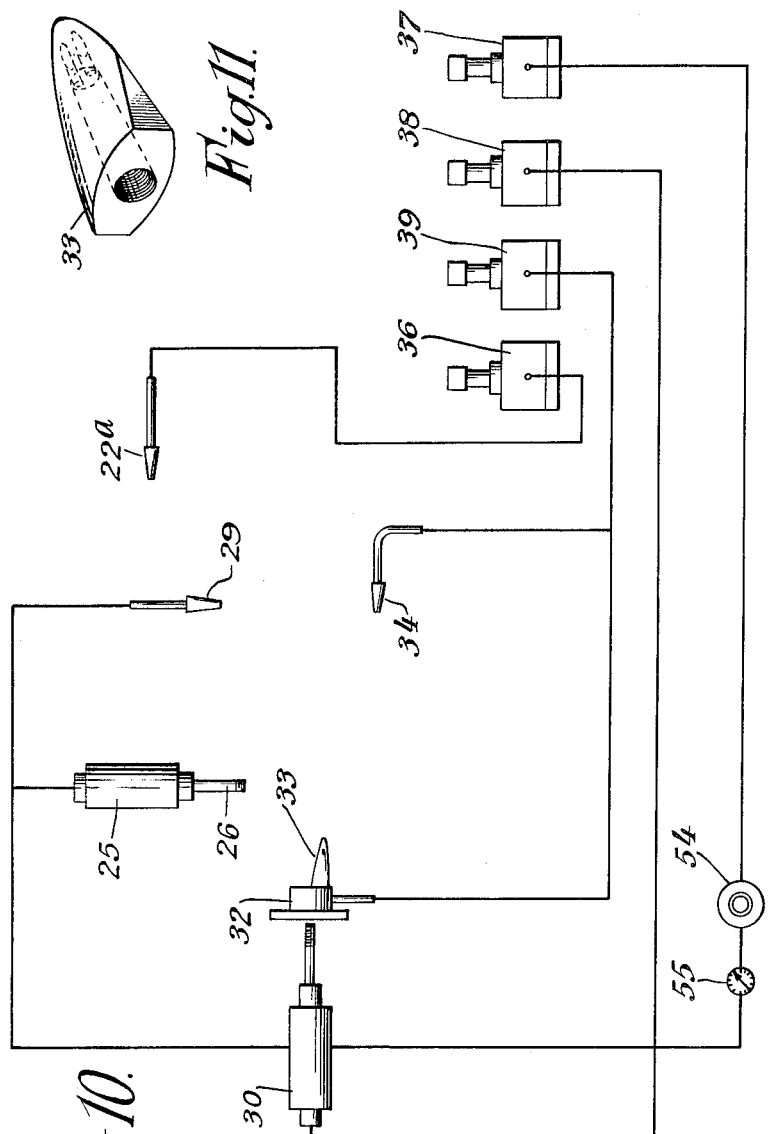

United States Patent Office 3,220,049
Patented Nov. 30, 1965

3,220,049
APPARATUS FOR THE TREATMENT OF
EDIBLE CRUSTACEA
John Martin, Fleetwood, England, assignor, by mesne assignments, to The Laitram Corporation, New Orleans, La., a corporation of Louisiana
Filed Apr. 19, 1960, Ser. No. 23,177
Claims priority, application Great Britain, Apr. 24, 1959, 14,014/59
18 Claims. (Cl. 17—2)

This invention relates to an improved apparatus and process or the treatment of crustacea such as crayfish, prawns and the like, and particularly the species known as Dublin Bay Prawns (*Nephrops norvegious*), to remove the edible flesh from the tail portions and render it ready for marketing as processed products for human consumption. The tail portions of these creatures are severed from the non-edible head and body portions, and they then require to have the edible flesh separated from the enclosing shell.

It is well known that according to the methods of processing hitherto practised considerable skill is required for, not only must the shell be removed from the fleshy edible part, but also it is necessary to remove the contents of the black vein or sand sac which runs substantially the full length of the tail of the prawn, and terminates at the tail end of the fish in the central tail fin. Hitherto this last requirement has been met by removing the vein itself, with its contents, if necessary with the use of tweezers or like tools. The apparatus and method for automatically removing, or flushing out, this black vein is described and illustrated herein, but is the subject matter of a separate application filed April 19, 1960, Serial No. 23,178. The invention of this application sets forth an apparatus and method for removing the edible flesh, in one piece, from the severed tail portions of crustacea. It also sets forth such an apparatus and method in combination with the flushing appartus and method of said co-pending application.

Prior to the present invention, the processing of the said crustacea to separate the edible flesh of the tail was effected entirely by manual operation, and consequently was slow and laborious even with skilled labour and therefore the ultimate product (known in the trade as "Scampi") was relatively costly. Further, only comparatively unskilled labour was available, and the flesh portion was often broken and/or a high proportion of the flesh was left adhering to the shell during the removal process, and thrown to waste, both which defects reduced the yield of best quality scampi and added to the cost of the ultimate product.

The object of the invention is to provide an improved process and apparatus for the treatment of these edible crustacea whereby the removal of the shell from the edible flesh of the tail portion can be effected easily and quickly, and with comparatively unskilled labour, so that a much better and cheaper product results.

The present invention provides a method of processing the tail portions of crustacea such as crayfish, prawns and the like to separate the edible flesh wherein the crustacea tail is held by means which engages the surrounding shell and, whilst so held, has the enclosed flesh portion removed therefrom by fluid pressure introduced into the shell at its smaller end. This removal of the flesh from the shell will be accomplished by the use of either air or water ejected under suitable pressure from a nozzle inserted into the shell of the tail at or near the anus.

Another object of the invention is to provide a method and means for feeding crustacea tails first to a water nozzle applied to the anus for the flushing out of the sand sac, and then to an air nozzle inserted into the tail for ejection of the flesh from the shell.

In this connection the arrangement may be characterised by a first plurality of tail holders arranged side by side, each with a flushing water nozzle, followed by a second plurality of tail holders each with a flesh removing air nozzle, all at equal spacing so that an intermittent conveyor may feed a series of untreated crustacea tails to the first plurality of nozzles whilst simultaneously moving a like series of flushed crustacea tails on to the flesh removing nozzles. Thereby, one series of the fish tails may have the sand sac flushed out, with water, whilst another series, already flushed has the edible flesh portion removed from the shell, by air.

One example of apparatus for carrying out the invention according to the improved method of this invention, and also including the invention of the said co-pending application, is illustrated in the accompanying drawings, wherein:

FIG. 1 is a perspective view partly in section of the tail portion of a crayfish, from opposite ends;

FIG. 2 is an elevation of a machine which will automatically feed the crustacea tails one after another to a holding means, insert an air nozzle into the rear end of the held tail and, after ejection of the elible flesh from the shell, will convey away both the ejected flesh and the empty shell to respective collectors;

FIG. 3 is a plan of the machine;

FIGS. 4 and 5 are side elevation and plan respectively of one form of means for holding the crustacea tail whilst the sand sac is flushed out or the fleshy body is removed from the shell;

FIGS. 6 and 7 are a sectional side view and a fragmentary rear view of the means for holding, flushing and releasing the crustacea tail at the flushing station shown in FIGURE 3;

FIGS. 8 and 9 are respectively side elevation and front view of a part of a part of a driving means for giving alternating intermittent movements to parts of the mechanism shown in FIGS. 2 and 3;

FIG. 10 is a diagram showing the layout of the pneumatic system the main components of the machine; and FIG. 11 is a perspective view of one of the air nozzles for insertion into the shell of the tail.

Referring first to FIG. 1 the tail portion of a crayfish, the severed head and body part of which has been discarded as waste, has an upper tegulated hard shell *a* the lower extremities of which have a notched form providing recesses *b* between feet or fins *c*. This shell *a* is bridged by a flexible horny membrane *d*, forming the underskin between which and the said shell *a* the edible flesh *e* is held. This flesh is traversed by the sand sac or vein *f* terminating at the anus *g* in the centre tail fin *h*, between two horn-like protuberances *i*. There are also two side tail fins *j*.

Referring now in the main to FIGS. 2 to 5 and 8 to 10, a machine for mechanically and automatically carrying out a continuous process according to the invention comprises a base 10 (which would be the top of a tablelike structure) on which is mounted an electric motor 11 (this could be below the base 10), the motor driving by a belt and pulley drive 12, a cam shaft 13. At one end this cam shaft 13 drives a double Geneva motion 14 (see FIGS. 8 and 9), one part of which gives an intermittent drive to the shaft 15 of an endless belt discharge conveyor 16 arranged to convey away the ejected flesh portions of the crustacea tails after they have been ejected from their shells by an air nozzle as is explained below. The shaft 15 also drives a transit conveyor 24 described below.

The other part of the Geneva motion gives an intermittent drive to bevel gears 17, 18, the latter being fixed to a shaft 19 which, through a chain 20 and sprockets 21 imparts the intermittent drive to an endless belt feed conveyor 22. Obviously, because of the Geneva motions, each partial rotation of shaft 15 will be slightly behind the corresponding partial rotation of shaft 19. The crustacea tails, in some cases after removal of one or more of the tail fins, are delivered singly and in end to end order, rear end foremost, to the feed conveyor belt 22 by hand or by any suitable automatic means. There could be for example a means receiving them in random arrangement and so orientating them that they are delivered to the belt 22 in end-to-end spaced relationship with the rear end leading. It is necessary, in the machine shown, that the tails reach the transit conveyor 24 upside down as well as the rear end leading.

Each tail of a prawn or the like arriving at the delivery end of feed conveyor 22 is delivered therefrom to one of a number of shallow troughs, buckets or scoops 23, arranged transversely of and spaced along the length of the said transit conveyor 24 which is disposed at right-angles to the feed conveyor 22 (see especially FIG. 3) and such transit conveyor is driven intermittently by the shaft 15 in step with and at the same speed as the conveyors 16 and 22 but, as explained above, conveyor 22 is a step in advance of conveyor 24 so that it always delivers to a stationary trough or bucket 23 on the conveyor 24. To assist in the complete transfer into the trough 23 an air nozzle 22$^a$ is arranged to discharge periodic jets of air at the correct time to blow the tail into the stationary trough. The mechanisms for this is explained below. A stop plate 24$^d$ along the front of conveyor 24 serves as a limit stop when engaged by the tail fins $h$ and $j$.

The transit conveyor 24 is adapted by its stepwise movements to locate each prawn or like tail in turn below a holding means and, when so disposed and held, each tail remains stationary (the conveyor being stationary at such time) ready to receive a slidably mounted ejector air nozzle 33 as the latter is moved towards the adjacent end of the prawn on actuation of the pneumatic system diagrammatically illustrated in FIG. 10. This nozzle is of spear head form (see FIG. 11) so as to pierce the horny membrane $d$ in the region of the anus $g$ as it is jabbed into the tail.

One form of holding means is shown in FIGS. 4 and 5. It comprises a pneumatic cylinder 25 with a vertically slidable ram 26, and to the lower end of said ram is attached a crosshead 27, guided by sliding rods 27$^a$ and carrying on its under face a resilient presser block or pad 27$^b$. As illustrated more clearly in FIG. 4, the pad or block 27$^b$ is inclined on its under surface so as to accommodate itself to the tapering form of the crustacea tail. As these tails vary in size, the troughs 23 of the transit conveyor 24 may be of a springy material, e.g., a flexible but stiff synthetic material so as in the case of small tails, to be deformed by the descending pad 27$^b$ until that pad engages the tail with a holding pressure.

In the form illustrated the conveyor 24 is made up of two roller chains to which the buckets or scoops 23 are attached. In order to resist the downward thrust of the pad 27$^b$, supports 1$^a$ standing up from the base 10 engage the ends of the bucket 23 when under the pad 27$^b$.

The holding means are mounted in a bracket 28 attached to the front of the machine and, located in said bracket and downwardly extending therefrom, is a tail spreader nozzle 29 adapted to impart a blast of air to the tail fins of the prawn and spread them on a supporting bracket (see the part 1$^a$ in FIG. 4 or the part 29$^a$ in FIG. 6) just before the ejector air nozzle 33 (described below) moves forward to penetrate the tail.

As stated above, the machine illustrated requires that the tails be upside down. In order to prevent their turning over under the stepwise jerky advance of the conveyor, and in order also to resist the tendency of the advancing nozzle 33 to push the tails along the scoops or buckets, wire guides 24$^b$ and 24$^c$ are provided, mounted at their ends on suitable fixed parts of the machine and adapted to engage in some of the recesses $b$ of the tails. Furthermore, the wire 24$^b$ is deflected in the approach to the holding means so as to assist in flattening out the tail fins. This is important not only to ensure that the advancing nozzle 33 will be above the centre tail fin $h$ but also to ensure that the horn-like protuberances $i$ are in position to engage the sides of the nozzle and centre the tail relatively to the axis of the nozzle.

Located in the bracket 28 is a second cylinder 30, disposed horizontally, that is at right-angles to the air cylinder 25. This cylinder 30 has a ram 31 on which is mounted the nozzle housing 32 from which extends the said air nozzle 33. The nozzle 33 is removable for interchange or cleaning or sharpening. It is of spear head form, see FIG. 11, with sharpened side edges and a point adapted to pierce the horn-like membrane $d$ of the tail. The air outlets of the nozzle are in its underside.

Opposite the nozzle 33 and running along the rear edge of the discharge conveyor 16 is a stop plate 16$^a$ which obstructs the flesh ejected from the shells by the nozzle and causes it to remain on or to drop back on to the discharged conveyor.

As will be clear from FIGS. 3 and 10 the pneumatic system also includes a further nozzle 34 adapted to remove the empty shells from the conveyor 24 after they have been operated on by the ejector air nozzle 33, and to pass them into a chute 34$^a$. Also shown in FIGS. 3 and 10 is the control means whereby the pressure air supply is delivered to each of the several nozzles as and when required, in timed relationship with the various mechanical operations of the machine. Such control means comprises a valve block 35 located on the base 10 below the cam shaft 13, in which block are four air valves 36, 37, 38 and 39 adapted to be operated respectively by cams 40, 41, 42 and 43 fixed on the cam shaft 13. By this arrangement the four valves are actuated by their respective cams in timed relationship with the drive to the various conveyors of the machine, and a continuous process results. The valve 36 controls the nozzle 22$^a$ for transfer of the tail from conveyor 22 to conveyor 24; valve 37 controls the descent of the holding pad 27$^b$ and the operation of the tail spreader nozzle 29; valve 38 advances the nozzle 33 and valve 39 controls the discharge of air from the nozzle 33 as well as the operation of the shell ejector nozzle 34.

In operation, the crustacea tails are received in endwise succession by the feed conveyor 22 and are delivered one by one to the successsive scoops or buckets 23 of the conveyor 24 in upside down position at a loading section 56 with their tail fins extending towards the front of the machine. The conveyor 24 is moved stepwise and each prawn or the like in turn becomes positioned beneath the holding means, first at the flushing station 51 and then at the de-shelling station 53. At the de-shelling station 53 air is admitted to the cylinder 25 by air valve 37 and the presser block or pad 27$^b$ moves downwards to hold the prawn or like tail against the stationary bucket or scoop 23 to hold the tail and await the insertion into the tail of the ejector air nozzle 33 which is effected by actuation of the air valve 38 to admit air to cylinder 30 to move the nozzle and its housing towards the prawn.

Actuation of air valve 37 also admits air to the tail fin nozzle 29 which releases an air blast to spread the tail fin to ensure that as and when the nozzle 33 moves on to the tail the latter is correctly disposed and insertion is effected at the correct point. The blast of air from nozzle 33, under control of valve 39 then ejects the fleshy body portion of the tail from the shell on to the discharge conveyor 16. The presser pad 27$^b$ is now lifted to release the prawn, and the conveyor belts are all moved by their respective Geneva motions to bring the next prawn or the like beneath the holding means, and to move both the ejected flesh on conveyor 16, and the empty shell in the scoop 23 towards their respective collecting points.

It will be seen from FIG. 10 that the ejector air nozzle 33 which removes the edible fleshy body from the shell, and then ozzle 34, at discharge station 57, for removal of the empty shell out of the conveyor 24 are on the same air line and therefore operate simultaneously, so that as nozzle 33 is effecting removal of the flesh from one tail, the other nozzle 34 is blowing the empty shell of another tail from the conveyor 24. The tail jet 29 and the presser pad 27ᵇ may also be actuated simultaneously. The strength of the air blast from the nozzle 34 is enough to remove an empty tail shell from conveyor 24, but is not sufficient to remove a prawn or like tail which has not been successfully operated upon by the ejector nozzle 33. By this arrangement, the empty shells and the full shells or only partly-emptied shells are delivered separately from the machine into their respective receptacles.

Each body successfully and cleanly ejected from its shell eventually falls off the end of the conveyor 24 into a chute 24ᵃ leading to a collecting receptacle (not shown).

The pneumatic system includes a reducing valve 54, a gauge 55, and a flow regulator, in order to ensure good control of the air pressure and successful operation of the machine. The air pressure supply may be from a separate compressor unit and accumulator, or such unit may be built into the machine.

Referring now to FIGURES 6 and 7, the flushing operation for cleaning out the contents of the sand sac or vein (with or without the vein itself) may either precede or occur simultaneously with the separation of the edible flesh from the shell. In this case flushing of the sand sac takes place at one station, such as station 51, and separation of the edible flesh from the shell takes place at another point, such as station 53.

As shown, there is an upright stand 61 with overhanging arm 62, this stand being built on the base or table 10 of the machine. Said arm 62 carries a pneumatic cylinder 63 whereby a head 44 may be raised and lowered, being guided by the rods 45. This head 44 is fitted on its lower side with a resilient pad 46 adapted, as the head descends, to grip the tail with a gripping pressure along the whole length of the tail, the tail at the time being held in the bucket or scoop 23.

Carried by the head 44 is a plate 47 from which is suspended a block 48, here being compression springs 49 between this block and the plate 47. The block 48 is ported at 50 and receives water under the control of a fifth valve (not shown) operated from the before-mentioned cam shaft 13.

Below the said block 48 is a rubber or like resilient nozzle 52, the orifice of which is in communication with the said port 50, and the lower end of which is tapered so as to be co-planar with the lower face of the pad 46 when the parts are unstressed. Such orifice is large enough to ensure its being open to the anus of the tail, regardless of the size of the tail. The resilient nozzle 52, forms a flexible seal therearound for directing fluid under pressure into the anus without piercing the skin, penetrating the anus or requiring exact registration.

In operation, with a tail lying in the scoop 23 and held stationary below head 44, first the tail is gripped by the descending pad 46 and then water under pressure is admitted to the port 50. Because, at that time the outlet of the nozzle 52 is in register with the adjacent end of the sand sac in the tail, the water jet or stream from the nozzle flushes the contents of the sac out at the larger end of the tail. Thereafter, the water is shut off by the valve 39, or by the said fifth valve, the head 44 is raised and the bucket 23 is moved on by the conveyor 22 to the next station, indicated at 53 in FIG. 7, where the body of the creature is ejected from the shell as set forth above.

As explained above, flushing of the sand sac takes place at one station and separation of the edible flesh from the shell takes place at another point, the flushing head being followed immediately by the deshelling station. The stepwise movement of the conveyor 24 is such as to take each scoop 23 through a station at each step, thereby bringing one unprocessed tail portion to the flushing head and one flushed tail portion to the deshelling station at each step of movement.

What we claim is:

1. Apparatus for removing the edible flesh, in one piece, from tail portions which have been severed from the head and body portions of crustacea of the crayfish, prawn or similar type, said apparatus comprising an endless conveyor extending along a path through a feed station, a flushing station, a de-shelling station and a discharge station; a plurality of identical, tail portion troughs spaced around said conveyor; intermittent drive means advancing said conveyor unidirectionally between stations and halting said conveyor temporarily with one of said troughs at each of said stations; flushing mechanism at said flushing station said mechanism including means for holding a tail portion against movement in its trough halted at said station and means for applying to the region of, and introducing a jet of liquid under pressure into, the anus at the small end of said tail portion for cleaning the sand sac, or vein thereof and de-shelling mechanism at said de-shelling station, said mechanism including means for holding a tail portion against movement in its trough halted at said station and ejection means for introducing a jet of fluid under pressure into the interior of the small end of said tail portion for exerting fluid force on the edible flesh therewithin to expel the same from the large end thereof.

2. Apparatus for removing the edible flesh, in one piece, from tail portions which have been severed from the head and body portions of crustacea of the crayfish, parwn or similar type, said apparatus comprising conveyor means for advancing a plurality of said tail portions individually and successively along a path; intermittent drive means actuating said conveyor for halting said conveyor with a tail portion at a de-shelling station along said path; holding means, at said de-shelling station, for engaging the shell of each successive tail portion and retaining the same against movement and ejection means at said de-shelling station for introducing fluid pressure into the interior of the small end of each said tail portion, so held at said station to expel the edible flesh therewithin from the large end of said tail portion.

3. Apparatus according to claim 2, wherein said ejection means comprises a fluid nozzle shaped so as to pierce the outer shell of the tail, having control means associated therewith for controlling the supply of fluid pressure thereto.

4. Apparatus according to claim 3 plus means for moving said nozzle relative to the shell of the tail to effect insertion and withdrawal of the nozzle into and from the tail, and means for releasing and shutting off the fluid pressure to the nozzle after such insertion and before such withdrawal of the nozzle.

5. Apparatus according to claim 3 wherein said fluid nozzle is mounted on a sliding member actuated by pneumatic means for advance and retraction in time relation ship with said fluid pressure control means so that the latter delivers the pressure fluid to the nozzle only when the nozzle is in its advanced position.

6. Apparatus according to claim 2 wherein said conveyor means and said intermittent drive means include a first intermittently-actuated endless conveyor belt for delivering the tails of prawns or the like one by one with the tail end leading to a second intermittently-actuated conveyor feed belt moving at right angles to the said first belt, whereby a tail portion is transferred from the first belt to the second belt, each time the latter is at rest, with the tail portions correctly disposed on said feed belt for movement one by one along said path to said holding means.

7. Apparatus according to claim 6, plus an air jet located at the point of transfer from said first conveyor belt to said second belt, and means for operating said jet intermittently to blow a prawn tail from said first belt as it moves, on to said second belt while it is stationary.

8. Apparatus according to claim 2, wherein said conveyor means includes a plurality of open ended, shallow transverse troughs of resilient, yieldable, self supporting material spaced from each other and adapted to accommodate tail portions of various witdhs and lengths.

9. Apparatus according to claim 2, plus guide wires extending along said path in advance of said de-shelling station to engage in the recesses in the shells of the tails and thereby hold the shells in correct position as they advance to said de-shelling station.

10. Apparatus according to claim 2, wherein said holding means includes a vertically movable, resilient pressure member mounted above said path at said de-shelling station and means for moving said member toward each successive tail portion halted thereunder, to hold same ready for introduction of said pressure fluid.

11. Apparatus according to claim 3 plus air jet means mounted at said de-shelling station for spreading the tail fins of each said halted tail portion to facilitate insertion of said nozzle into the shell.

12. Apparatus according to claim 2 plus flesh conveyor means alongside said path for receiving and conveying away the ejected flesh portions as they are ejected from the shells at said de-shelling station, and air jet means along said path in rear of said de-shelling station for removing the empty shells from said conveyor means.

13. Apparatus as specified in claim 2 wherein said ejection means includes a sharp edged air jet nozzle mounted to move toward and away from a tail portion in said holding means at said de-shelling station and cam actuated air pressure control means synchronized with said intermittent drive means and pneumatically connected to said nozzle for advancing said nozzle to pierce into the interior of said tail portion, exert air pressure on the edible flesh therewithin to eject the same, shut off said pressure and retract said nozzle.

14. Apparatus according to claim 2 plus flushing mechanism mounted at a flushing station along said conveyor path and operable simultaneously with said holding means and said ejection means, said flushing mechanism including a water pressure nozzle of resilient material adapted to form a flexible seal and mechanism for moving said nozzle toward and away from the anus of each successive tail portion halted on said conveyor means at said flushing station.

15. Apparatus for automatically removing the edible flesh in one piece, from tail portions which have been severed from the head and body portions of crustacea of the crayfish, prawn or similar type, said apparatus comprising:

conveyor means for advancing a plurality of said tail portions individually and successively along a path to a de-shelling station;

holding means at said de-shelling station for engaging the shell of each successive tail portion and temporarily retaining the same against movement;

and ejection means at said de-shelling station for introducing fluid pressure into the interior of the small end of each said tail portion, so held at said station, to expel the edible flesh therewithin, in one piece, from the large end of said tail portion.

16. Apparatus as specified in claim 15 plus vein treatment mechanism mounted at a flushing station along said path, said mechanism including:

second holding means at said flushing station for engaging the shell of each successive tail portion and temporarily retaining the same against movement;

and vein treatment means at said flushing station, said means including a member having an orifice and mechanism for moving said orifice toward and away from the region of the anus of each successive tail portion, so held at a said flushing station, to treat the vein therein.

17. A machine for recovering edible meats from tails of hard shelled type crustacea in which the shells are intact at one end of the tail but removed at the other end for the discharge of meat masses comprising:
(a) a movable carrier for supporting the tails;
(b) means for spacing the tails on the carrier;
(c) a first grasping means positioned to clamp a tail to the carrier;
(d) de-veining means located to extract the vein while held to the carrier by said first grasping means;
(e) a second grasping means positioned to grasp the tail after removal of the vein and,
(f) fluid injection means operatively positioned adjacent the second grasping means for injecting fluid between the edible meat and shell to expel the meat through the open end of the shell.

18. A machine for recovering edible meats from hard shelled crustacea tails having shell-on and shell-off end portions comprising:
(a) means for detaching the vein from the shell and meat;
(b) means for removing the detached vein, and
(c) means associated with at least one of said means for pressurizing the internal space within the shell at the shell-on end to drive out the meat through the shell-off end.

References Cited by the Examiner
UNITED STATES PATENTS

| | | | |
|---|---|---|---|
| 2,546,414 | 3/1951 | Abbott | 17—2 |
| 2,641,797 | 6/1953 | Waltman | 17—32 |
| 2,644,980 | 7/1953 | McKinstry | 17—2 |
| 2,784,450 | 3/1957 | Jonsson | 17—45 |
| 2,838,786 | 6/1958 | Ward | 17—2 |
| 2,850,761 | 9/1958 | Jonsson | 17—2 |
| 2,903,737 | 9/1959 | Ward | 17—2 X |

SAMUEL KOREN, *Primary Examiner.*

CARL W. ROBINSON, LUCIE H. LAUDENSLAGER,
*Examiners.*